United States Patent [19]

Fukushima et al.

[11] Patent Number: 4,674,699

[45] Date of Patent: Jun. 23, 1987

[54] BACKLASH PREVENTING DEVICE FOR FISHING REEL

[75] Inventors: Noriyasu Fukushima; Takashi Higashimoto, both of Tokyo, Japan

[73] Assignee: Daiwa Seiko Inc., Tokyo, Japan

[21] Appl. No.: 771,263

[22] Filed: Aug. 30, 1985

[30] Foreign Application Priority Data

Sep. 3, 1984 [JP] Japan .................................. 59-184064

[51] Int. Cl.$^4$ .............................................. A01K 89/02
[52] U.S. Cl. ............................ 242/84.52 B; 242/84.53
[58] Field of Search ...................... 242/84.52 B, 84.53

[56] References Cited

U.S. PATENT DOCUMENTS

| 2,550,861 | 5/1951 | Ransom | 242/84.52 B |
| 4,544,111 | 10/1985 | Nakajima | 242/84.52 B |
| 4,549,703 | 10/1985 | Atobe | 242/84.52 B |
| 4,575,024 | 3/1986 | Kaneko | 242/220 |
| 4,586,674 | 5/1986 | Nakajima | 242/84.52 B |

FOREIGN PATENT DOCUMENTS

| 58-55477 | 4/1983 | Japan | 242/84.52 B |
| 58-65876 | 5/1983 | Japan | 242/84.52 B |

Primary Examiner—Billy S. Taylor
Attorney, Agent, or Firm—Kalish & Gilster

[57] ABSTRACT

A backlash preventing device for a fishing reel which comprises a spool, a non-magnetic component provided with said spool, magnets for applying magnetic fluxes of a predetermined strength to said non-magnetic component for generating a braking torque at the initiation of the reel usage; there being an adjustor for controlling the strength of the magnetic flux to be exerted. A clutch mechanism is provided for the spool and with there being a timing control element for maintaining said braking force in spool rotational restraining condition for a period determined adequate to prevent backlashing.

9 Claims, 13 Drawing Figures

BACKLASH PREVENTING DEVICE FOR FISHING REEL

BACKGROUND AND SUMMARY OF THE INVENTION

The present invention relates to a backlash preventing device for a fishing reel and, more particularly, to a backlash preventing device for preventing a fishline from backlashing by restraining the rotating speed of spool at the commencement of casting from becoming greater than the let-off speed needed by the fishing line.

In the prior art, there exists a backlash preventing device for a fishing reel, as is disclosed in Japanese Utility Model Laid-Open No. 58-13076. This device is constructed such that there is attached integrally and coaxially to a spool a braking cylinder which is made of a non-magnetic conductive material, such that a plurality of magnets are arranged equi-distantly on the inner and outer circumferences of that cylinder and at a desired spacing from the circumferential faces so that a braking torque directed oppositely to the rotating direction of the cylinder is generated in the cylinder by eddy currents which are established when magnetic fluxes of those inner and outer magnets extend through the cylinder thereby to brake a spool to prevent the backlash of the fishline, and such that the braking force to be applied to the spool can be adjusted by changing the relative positions of the inner and outer magnets in the circumferential direction, and such that the adjustment of the braking force is performed by operating a dial which is connected to the frame of the aforementioned inner or outer magnets. Moreover, the setting of the force for braking the spool is performed by making an adjustment to a predetermined scale in advance of the casting in accordance with the kind of hook and bait, the distance to a point, and so on, and the graduations are so set that the rotating speed of the spool immediately after the start of the casting does not overcome the let-off speed of the line, i.e., that the rotating speed is set at the optimum value that will restrain the high-speed rotations of the spool to prevent the backlash of the line.

Here, the braking torque Tc by the aforementioned eddy current brake is given by the following Equation:

$$Tc = k\phi^2 n \quad (1)$$

(wherein k : a constant: $\phi$ : a magnetic flux; and n : the rotating speed of the spool).

Figure 7:
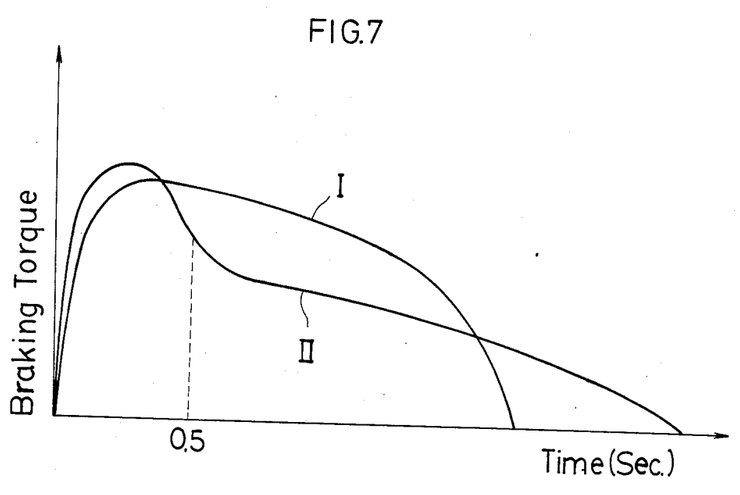
FIG. 7 is a graph plotting the braking torque characteristics of the present invention and the prior art.

As a result, the braking torque characteristics during the casting are plotted, as indicated by Curve I of FIG. 7, if the braking force to the spool is so preset as to restrain the high-speed rotations of the spool at the initial stage of casting. On the other hand, it takes about 2 to 3 seconds from the casting initiation for the hook and bait to be cast to a point spaced away about 30 m. However, there occurs about 0.5 seconds immediately after the casting starts sufficiently high speed spool rotation to establish backlash in the line. This line backlash can be prevented if the interim rotating speed is restrained. If the braking force is still set at the value at the stage of casting initiation even after the above-specified lapse time of 0.5 seconds, however, the the spool rotation is restrained more than necessary because the braking torque is proportional to the square of the magnetic flux $\phi$, as is apparent from the foregoing Equation (1). This results in reduction of the casting distance of the hook and bait. If the casting force is increased so as to increase the distance, on the other hand, the rotating speed of the spool at the starting stage of the casting may invite the backlash in the line. In either event, there arises a problem that the casting distance of the hook and bait are restrained more than necessary. Since the setting of the braking force and the operation of releasing the clutch are conducted independently of each other in the prior art, moreover, another problem is that the casting operation is thereby complicated.

The present invention has been conceived so as to solve the aforementioned problems of the prior art, therefore it is an object of the invention to provide a backlash preventing device for a fishing reel, which is enabled to ensure the backlash prevention of a fishline, to improve the casting distance of hook and bait and to facilitate the casting operation.

In order to realize the above-specified object, the backlash preventing device for a fishing reel comprises: a non-magnetic conductor mounted integrally in a spool; magnets for applying to said non-magnetic conductor magnetic fluxes for generating a braking torque from resulting eddy currents; an adjuster for adjusting the magnetic fluxes of said magnets acting upon said non-magnetic conductor; a setting mechanism for operating said adjustor to arbitrarily adjust the braking force upon said spool; and a knob arranged movably in front of said spool for releasing a clutch between said spool and a line take-up drive mechanism, characterized in that, when said knob is moved farther from a clutch releasing position, said adjustor is made movable in response to the movement of said knob and in association with said clutch.

BRIEF DESCRIPTION OF THE DRAWINGS

FIG. 12 is a vertical view taken substantially on the line IV–IV of FIG. 1 but illustrating a still further brak

DESCRIPTION OF THE PREFERRED EMBODIMENTS

The present invention will be initially described in connection with the embodiment illustrated in FIGS. 1 to 6.

In FIGS. 1 to 6, reference numeral 1 indicates a reel frame which is constructed of left and right side plates 2 and 3. In side plates 2 and 3, there are journaled for rotation the portions of a spool shaft 4 on which a spool 5 is coaxially mounted.

Spool shaft 4 projects through the aforementioned right reel side plate 3 into a cover 6. A pinion 7 is so mounted on the projecting end of spool shaft 4 so that it is slideable in the axial direction and is rotatable. The pinion 7 is coupled to the reel shaft 4 through a clutch 8 and is biased in a direction to engage with clutch 8 by a first clutch actuating plate 9 which is biased in a direction toward the reel side plate 3. Moreover, reel side plate 3 is arranged with a bifurcated second clutch actuating plate 10 for actuating the first clutch actuating plate 9 in the clutch opening direction such that it is enabled to slide in a direction normal to the first clutch actuating plate 9 by means of pins 11 and 12 which are formed to project from the reel side plate 3. Moreover, the second clutch actuating plate 10 is biased by the action of a dead point spring 53, which is mounted between the two shoulders thereof and the aforementioned pins, to a state, in which a sloped portion 10a formed thereon is forced into the gap between the first clutch actuating plate 9 and the reel side plate 3, as shown in FIG. 2, to release the clutch 8, and to a state in which the sloped portion 10a is disengaged from the first clutch actuating plate 9, as shown in FIG. 3, to apply the clutch 8.

Figure 2:
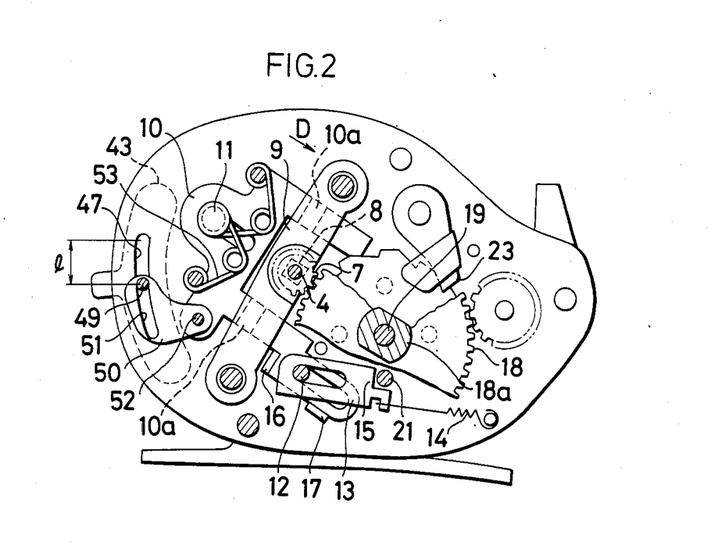
FIG. 2 is an interior side elevational view taken from the right hand side of FIG. 1 with cover 6 removed illustrating the clutch mechanism in engaged relationship.
Figure 3:
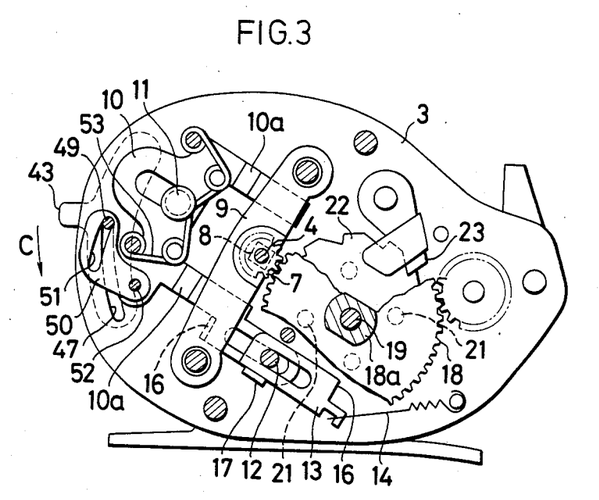
FIG. 3 is an interior side elevational view taken from the right hand side of FIG. 1 with cover 6 removed illustrating the clutch mechanisms in disengaged relationship.

To the pin 12 with which one leg of the bifurcation of the aforementioned second clutch actuating plate 10 is brought into engagement, there is attached movably through a slot 13a in opening plate 13 which is made operative to return the second clutch actuating plate 10 in the clutch releasing state of FIG. 2 or to the clutch applying state of FIG. 3. Moreover, the opening plate 13 has its one end pulled in one direction by the action of a spring 14 and its pulled portion formed with a retaining portion 15. On the other hand, the aforementioned bifurcation is formed with projections 16 and 17 with which the aforementioned opening plate 13 is brought into engagement.

Reference numeral 18 indicates a drive gear which is in meshing engagement with the aforementioned pinion 7 and which is mounted rotatably on a spindle 19 projecting from the aforementioned reel side plate 3. A fishline winding handle 20 is attached to the boss 18a of that drive gear 18. To this drive gear 18, moreover, there is integrally attached a one-way ratchet wheel 22 which is formed with a plurality of such projecting kick pins 21 as engage with the retaining portion 15 of the aforementioned opening plate 13. A ratchet pawl 23 is in engagement with ratchet wheel 22.

Figure 4:
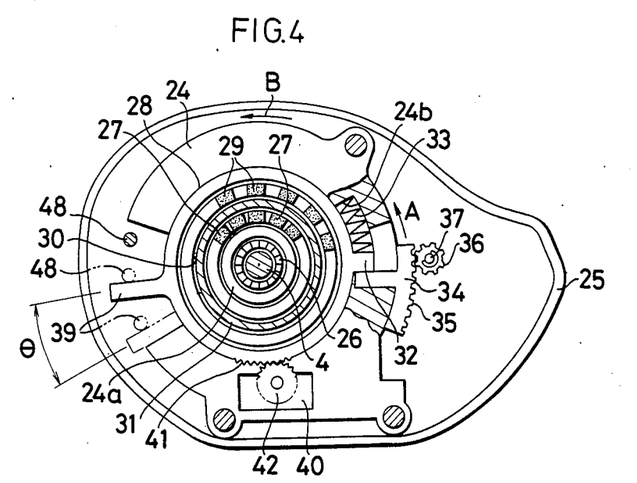
FIG. 4 is a vertical view in partial section taken on the line IV–IV of FIG. 1.

Referring to FIG. 4, reference numeral 24 indicates a holder case which is attached to the aforementioned left reel side plate 2 covered with a cover 25. In the central boss 24a of the holder case 24, there is rotatably borne one end of the aforementioned spool shaft 4 through a bearing 26, as shown in FIG. 4. Moreover, the aforementioned central boss 24a is arranged partially on its outer circumference with a plurality of magnets 27 which are so equi-distantly positioned that magnetic poles N and S appear alternately on their outer circumferences. On the outer circumferences of the magnets 27, on the other hand, there as arranged concentrically of the boss 24a a ring-shaped adjustor 28 which is borne rotatably in the aforementioned holder case 24. At the same time, the adjustor 28 is arranged partially on its inner circumference with a plurality of other magnets 29 which are so arranged equi-distantly as to face the aforementioned magnets 27, respectively, such that magnetic poles N and S appear alternately on their inner circumferences. In a ring-shaped space 30 thus formed between the inner and outer magnets 27 and 29, there is concentrically positioned a cylindrical non-magnetic conductor 31 which is made of aluminum or the like and which is attached integrally to the aforementioned spool 5. Thus, braking torques are generated by eddy currents, which are established when magnetic fluxes resulting from the aforementioned inner and outer opposed magnets 27 and 29 extend through the non-magnetic conductor 31, to restrain the rotations of the spool 5.

Figure 5:
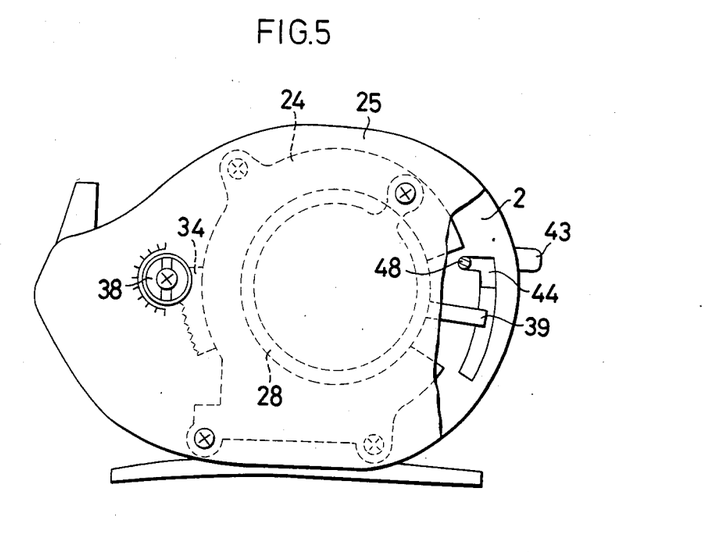
FIG. 5 is a partially cut-away side elevational view taken in the direction of the arrow V in FIG. 1.

On the other hand, the aforementioned adjustor 28 is formed with a projection 32 on its outer circumference. Between one side of this projection and an opposed stepped portion 24b of the holder case 24, there is mounted a compression spring 33 for returning the adjustor 28 to a set position. With the other side of the aforementioned projection 32, moreover, there is engaged a braking force setting member 34 which is so mounted on the aforementioned holder case 24 that it can move in the circumferential direction of the aforementioned adjustor 28. The braking force setting member 34 thus mounted sets the minimum of the braking force acting upon the spool 5 at an arbitrary value. For this setting, the braking force setting member 34 is formed with a rack 35 on an arcuate face of its outer circumference. A pinion 36 meshing with that rack 35 is fixed on a dial shaft 37 which is supported to extend through the cover 25. A braking force setting dial 38 is attached to the end of the dial shaft 37 extending from the cover 25, as shown in FIG. 5. From the outer circumference of the front of the aforementioned adjustor 28, on the other hand, there is formed to project in a radial direction an actuating arm 39 for setting the braking force of the spool 5 at the maximum. Moreover, timer means 40 for holding that braking force at the maximum for a predetermined time is so mounted in the aforementioned holder case 24 that it faces the outer circumference of the aforementioned adjustor 28.

That timer means 40 is equippped with a pinion 42 which is in meshing engagement with a rack 41 formed on the outer circumference of the aforementioned adjustor 28. Although the internal structure of the timer means 40 is omitted, an internal timer mechanism starts its operation, when the pinion 42 is rotated to a predetermined extent or more by the rotation of the adjustor 28 when adjustor 28 is brought into the state in which its braking force becomes the maximum (i.e., in which the actuating arm 39 is brought into the state indicated by single-dotted lines in FIG. 4 so that the inner and outer magnets 27 and 29 are aligned or face each other), to set the pinion 42 free after lapse of a predetermined time (e.g., 0.5 seconds after the start of the casting) so that the adjustor 28 is returned by the return spring 33 to the state in which the braking forces takes its minimum, as shown by solid lines in FIG. 4.

Figure 1:
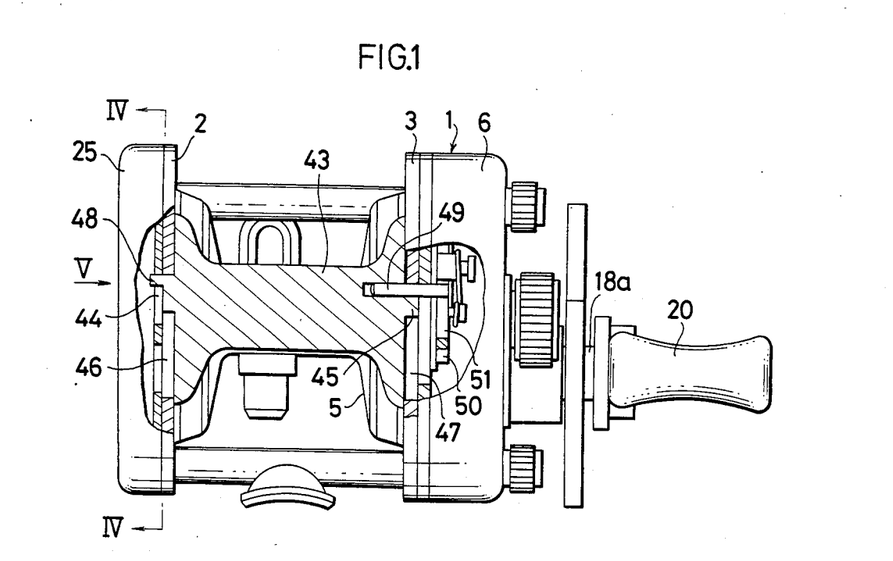
FIG. 1 is a front elevational view of a fishing reel equipped with the backlash preventing device of the present invention and with a portion being cut-away.

Reference numeral 43 appearing in FIGS. 1 to 3 indicates a knob which is arranged across the reel side plates 2 and 3 in front of the spool 5. This knob 43 is formed at its two ends with projections 44 and 45 which so engage with arcuate guide slots 46 and 47, which are formed in the aforementioned reel side plates 2 and 3 along the outer circumference of the spool 5, that they can slide in the longitudinal directions of the guide slots 46 and 47. Moreover, the projection 44 is formed with a projecting pin 48 which is brought into engagement with the actuating arm 39 of the aforementioned adjustor 28. At the same time, a clutch releasing pin 49 is anchored in the other projection 45. With the leading end of that pin 49 projecting into the cover 6 through the reel side plate 3, there is engaged an arcuate slot 51 which is formed in one end portion of a connecting member 50. The other end of this connecting member 50 is connected rotatably through a hinge pin 52 to one shoulder of the aforementioned second clutch actuating plate 10.

Next, the operations of the present embodiment having the construction described above will be explained in the following.

Upon the casting, the braking force setting dial 38 shown in FIG. 5 is first turned to move the braking force setting member 34 in the direction of arrow A of FIG. 4 through the pinion 36, and the adjustor 28 is turned an arbitrary angle in the direction of arrow B of FIG. 4 to adjust the relative positional relationships between the inner and outer magnets 27 and 29 thereby to adjust the intensities of the magnetic fluxes established through the non-magnetic conductor 31 by the two magnets 27 and 29, so that the braking torque generated by the eddy currents may be set at the minimum. Since, in the case of FIG. 4, the dial 38 indicates the scale "0", the inner and outer magnets 27 and 29 are so related that the same poles (i.e., the N or S poles) face each other. As a result, the magnetic fluxes of the two magnets 27 and 29 crossing the non-magnetic conductor 31 are so small that the braking torque is very weak.

Next, the knob 43 in the state of FIG. 3 is pulled in the direction of arrow C of FIG. 3 by the thumb of the hand of a fisherman grasping the casting handle so that it is moved by a distance 1, as shown in FIG. 2. Then, the second clutch actuating plate 10 is slid in the direction of arrow D, as shown in FIG. 2, through the releasing pin 49 and the connecting member 50 to have its sloped portion 10a driven into the gap between the first clutch actuating plate 9 and the reel side plate 3 thereby to release the clutch 8. Simultaneously with this, the opening plate 13 is pulled by the spring 14 so that the retaining portion 15 is positioned in the turning trajectory of the kick pin 21.

Figure 6:
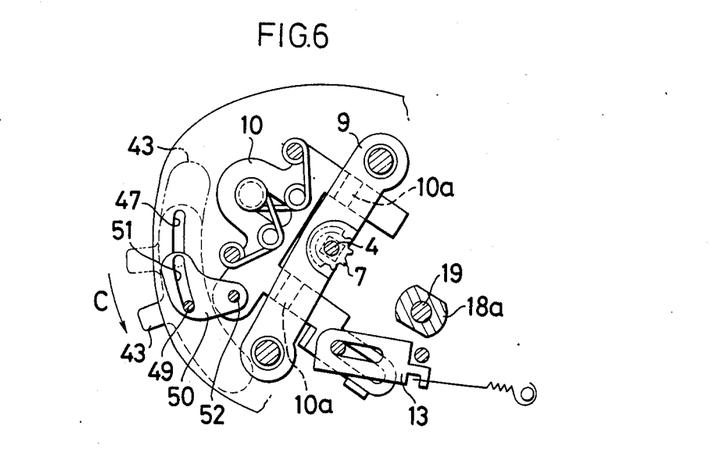
FIG. 6 is a fragmentary side view taken from the same point as FIGS. 2 and 3 for demonstrating the operations of a certain control knob .

By the operations thus far described, the clutch 8 is released to set the spool 5 free for letting off the fish line, and the knob 43 is moved in the direction of the arrow C from the state of FIG. 2 to the state shown by the solid lines in FIG. 6. Then, the pin 48 held substantially in the abutting state when the clutch is released comes into engagement with the actuating arm 39 to turn the adjustor 28 as a whole by an angle 0 against the spring 33 in the direction of the arrow B of FIG. 4. As a result, the respective inner and outer magnets 27 and 29 have their opposite poles (i.e., the N and S poles) facing each other so that the magnetic fluxes flowing across the non-magnetic conductor 31 are maximized to set the braking torque resulting from the eddy currents at the maximum. Simultaneously with this, the rack 41 of the adjustor 28 comes into meshing engagement with the pinion 42 to rotate the same thereby to set the timer means 40 in an operating state. In this state, the thickest part of the thumb is applied to the flanged portion of the spool 5 to hold the spool 5 stationery, and the fishing rod is swung down toward the point. Immediately before the hook and bait pass over the head of the fisherman, moreover, the thumb is released from the flanged portion of the spool 5 and the knob 43. If the time (e.g., about 0.5 seconds) set by the timer means 40 then elapses, the pinion 42 is set free so that the adjustor 28 set in the maximum braking force state is turned in the direction opposite to the arrow B by the release force of the spring 33 to automatically restore the position shown by the solid lines in FIG. 4 thereby to return the braking force of the spool 5 to the minimum value set by the setting member 34. At this time, the knob 43 is returned to a position shown by double-dotted lines in FIG. 6.

As a result, the braking torque characteristics during the casting are plotted by Curve II in FIG. 7. For the period of about 0.5 seconds from the instant immediately before the hook and bait pass over the fisherman's head to the instant when the hook and bait start to flow to the point, the maximum braking torque on the basis of the Equation $Tc = k\phi^2 n$ is exerted upon the spool 5 so that high-speed rotation of the spool is restrained at the starting stage of the casting to prevent the backlash from being established in the fishline. When the time set by the timer means 40 elapses, moreover, the braking force to be exerted upon the spool 5 returns to its minimum setting by the dial 38. As a result, the braking torque characteristics are elongated against the time abscissa, as shown in FIG. 7. This means that an unnecessary braking force is not applied to the spool 5 so that the flying distance of the hook and bait can be increased even under the same condition as that of the prior art.

If, under the clutch released state of FIG. 2, the handle 20 is turned in the line winding direction, on the other hand, the kick pin 21 of the one-way ratchet wheel 22 integrated therewith comes into engagement with the retaining portion 15 of the opening plate 13 to move this opening plate 13 in the direction toward the projection 16 so that the projection 16 is pushed to move the second clutch actuating plate 10 in the direction opposite to that indicated by the arrow D in FIG. 2. As a result, the second clutch actuating plate 10 applies the clutch 8, simultaneously as it is returned to the state of FIG. 3 by the dead point spring 53, so that the turns of the handle 20 can be transmitted through the drive gear 18 and the pinion 7 to the spool 5 to take up the fishline on the spool 5.

FIGS. 8 to 11 show another embodiment of the present invention, in which eddy current generating means is moved in the axial direction of the spool so that the density of the magnetic flux applied to the outer side of the flange of the spool is changed to adjust the braking force. Incidentally, the same components as those of the foregoing embodiment are indicated at the same reference numerals, and their descriptions are omitted.

A ring-shaped adjustor 60 having its cam portions 61 and 62 opposed diametrically is mounted in the holder case 24. Moreover, that adjustor 60 is formed with guide holes 63 and 64 in the vicinities of the cam portions 61 and 62. A sliding member 65 is formed into an inverted channel shape and is so mounted in the holder case 24 as to move in the axial direction by having its both-side legs 66 and 67 fitted through the guide holes 63 and 64 of the aforementioned adjustor 60 in a hole 24c formed in the holder case 24 and then by mounting a bias spring 68 through a washer 69. On those upper portions of the legs 66 and 67 of the sliding member 65, which face the spool 5, there are mounted yokes 70 and 71, on which magnets 72 and 73 are mounted. Reference numeral 74 indicates an eccentric cam which is turned by an externally operating knob, and numeral 75 indicates a braking force setting member for adjusting the maximum of the braking force by that eccentric cam 74.

Figure 8:
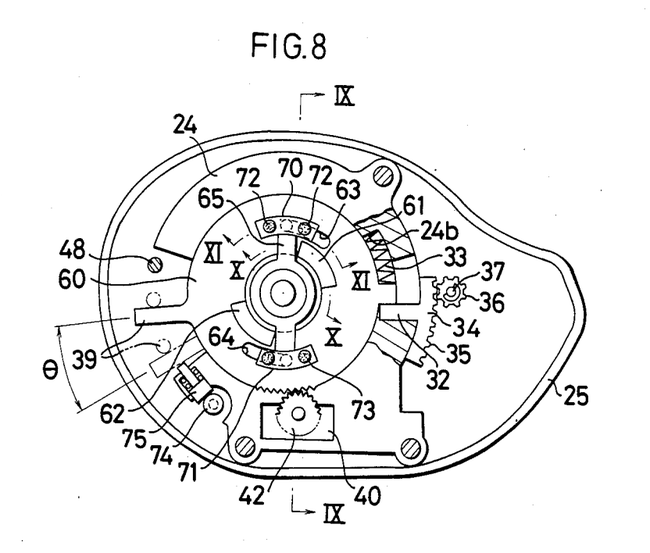
FIG. 8 is a vertical view taken substantially on the line IV–IV of FIG. 1 but illustrating another brake mechanism constructed in accordance with and embodying the present invention.
Figure 9:
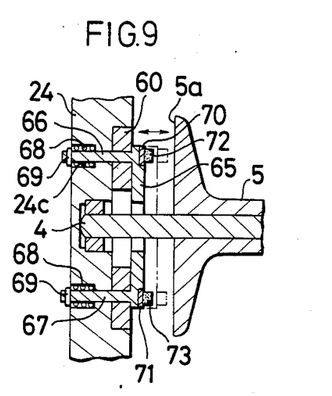
FIG. 9 is a fragmentary vertical transverse sectional view taken on the line IX–IX of FIG. 8.
Figure 10:
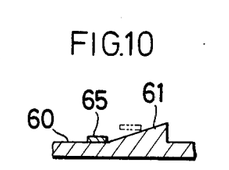
FIG. 10 is a fragmentary transverse sectional view taken on the line X–X of FIG. 8.

When the adjustor 60 is turned by an angle 0 against the spring 33 by the action of the pin 48, according to the present embodiment thus constructed, the sliding member 65 is moved in the axial direction, while being raised by the slopes of the cams 61 and 62, so that the density of the magnetic flux acting upon the flange outer side 5a of the spool 5 can be increased to maximize the braking torque.

Figures 11, 12, 13:
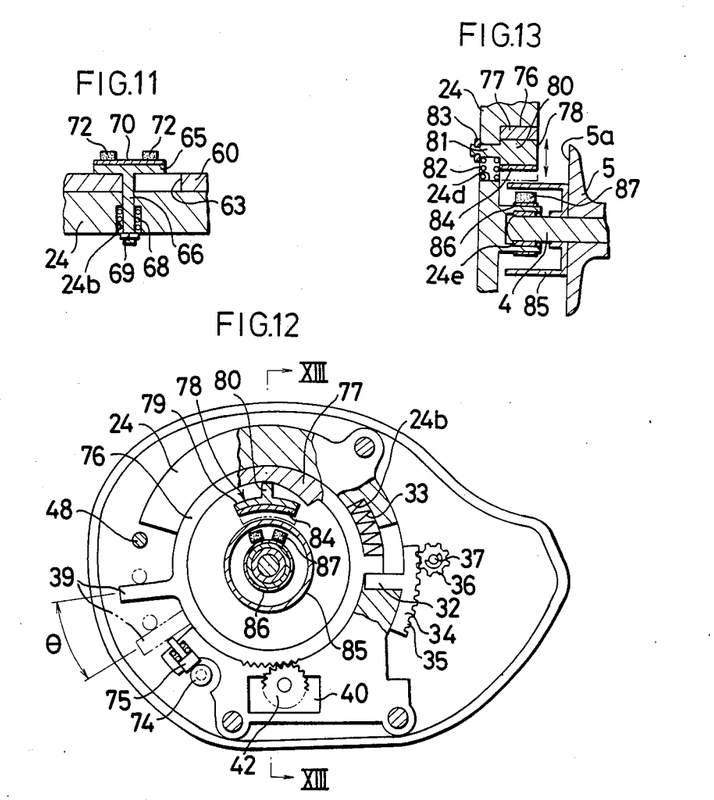
FIG. 11 is a fragmentary transverse horizontal sectional view taken on the line XI–XI of FIG. 8.
- FIG. 13 is a fragmentary vertical view taken on the line XIII—XIII of FIG. 12.

FIGS. 12 and 13 show still another embodiment of the present invention, in which eddy current generating means is moved in the radial direction of the spool shaft to change the density of the magnetic flux acting upon the non-magnetic conductor thereby to adjust the braking force. Incidentally, the same components as those of the foregoing embodiments are indicated at the same reference numerals, and their explanations are omitted.

An adjustor 76 is formed into a lens shape and is mounted in the holder case 24. Moreover, the adjustor 76 is formed with a cam portion 77 on a portion of its inner circumference. A sliding member 78 is so arranged that it can move in the direction of the spool shaft opposed to that cam portion 77. The sliding member 78 is constructed of an arcuate plate 79, a contact 80 merging into that plate 79, and a leg 81 merging into that contact 80. After the leg 81 is fitted in a hole 24d formed in the holder case 24, the sliding member 78 is so mounted as to move up and down by a bias spring 82 arranged in the hole 24d. Reference numeral 83 indicates a washer which is mounted to prevent the sliding member 78 from coming out. A yoke 84 is attached to the inner side of the plate 79 of the sliding member 78. At that inner side of the sliding member 78, which faces the yoke 84, there is positioned a non-magnetic conductive ring 85 which is attached to the flange outer side 5a of the spool 5. Inside of that non-magnetic conductive ring 85, moreover, a ring-shaped yoke 86 is attached to a spool shaft bearing 24e of the holder case 24, and several magnets 87 are mounted on that yoke 86.

When the adjustor 76 is turned by the angle 0 against the spring 33 by the action of the pin 48, according to the present embodiment thus constructed, the sliding member 78 can be moved in the radial direction, while rising on the slope of the cam 77, to increase the density of the magnetic flux acting upon the non-magnetic conductive ring 85 thereby to maximize the braking torque.

In the foregoing embodiments, the braking torque characteristics during the casting are set to be expressed by the Curve II of FIG. 7. However, the present invention should not be limited thereto but can be set to move the peak of the curve in parallel in accordance with the following various conditions. Since the timing of the backlash is shifted in accordance with the initial speed of the casting, the weight of the fishing rod, the thickness of the fishline and so on, all of which are made different in dependence upon the weight of the hook and bait, the muscle of the fisherman and so on, he can prepare the reels having the peak of the Curve II advanced or retarded in accordance with the conditions of the fishing start and can selectively use it in an arbitrary manner, if necessary. In the case of fishing by a beginner or a weak-muscled fisherman or under bad weather conditions, more specifically, there is a tendency for the occurrence of backlash to be retarded. It is, therefore, desirable to retard the peak of the Curve II of FIG. 7 in advance. In the case of this fisherman or condition, the reel so set is used.

In dependence upon the size of the reel, the weight of the hook and bait and so on, incidentally, the backlash may occur when the hook and bait dive into the water. For this fishing, the peak of the Curve II can be so shifted as to apply the braking force in accordance with the dive of the hook and bait.

Incidentally, the returning operation from the maximum to the minimum braking torque set position of the adjustor 28 may be performed in a manual manner. In this case, the timer means 40 may be dispensed with. Moreover, the return time of the adjustor 28 by the timer means 40 can be set at an arbitrary value.

As has been described hereinbefore, according to the present invention, the braking torque acting upon the spool can be set at two stages, i.e., at the minimum and maximum braking torques, and this maximum braking torque is exerted upon the spool for a predetermined time from the casting starting stage in which the backlash is caused in the fishline and is then switched to the minimum braking torque. As a result, it is possible to ensure the backlash prevention of the fishline and to augment the flying distance of the hook and bait. Since the setting operation of the maximum braking torque acting upon the spool and the clutch releasing operation can be controlled commonly by the knob, the braking torque setting and clutch releasing operations during the casting can be conducted exclusively by the thumb so that the casting can be effected stably and easily.

What is claimed is:

1. In a fishing reel comprising a spool having a spool shaft, opposite reel side plates for supporting the spool shaft rotatably in transverse orientation between the side plates, a clutch mechanism and a drive mechanism for said spool shaft, both the clutch mechanism and the drive mechanism being contained in one of the side plates, and magnetic braking means for preventing backlash, contained in the other one of the side plates, said braking means including adjusting means for causing variable braking torque for the spool by the magnetic braking means, the clutch mechanism detachably interconnecting the drive mechanism with the spool shaft, characterized by a thumb-actuatable member extending transversely between the side plates and supported for clutch-releasing movement upon thumb actuation, clutch actuating means interconnecting the thumb-actuatable member and the clutch mechanism for releasing the clutch upon said clutch-releasing movement, and means interconnecting the thumb-actuatable member and the adjusting means for varying the braking torque upon movement of the thumb-actuatable member.

2. In a fishing reel according to claim 1, further characterized by the braking mechanism comprising a non-magnetic member rotatably carried by the spool, magnets for applying to the non-magnetic member magnetic flux for generating a backlash preventing braking torque resulting from eddy currents in the non-magnetic member, said adjusting means positioning the magnets to vary the magnetic flux for varying the braking torque.

3. In a fishing reel according to claim 2, further characterized by the thumb-actuatable member providing first movement for releasing the clutch and further movement for changing the braking torque.

4. In a fishing reel according to claim 3, further characterized by the adjusting means being operable for changing between minimal and maximal braking torques, the adjusting means changing to the maximal braking torque in response to said further movement of the thumb-actuatable member, timing means for controlling the period of application of maximal braking torque, and means interconnecting the timing means with the adjusting means for causing changing from the maximal to the minimal braking torque at the end of said period.

5. In a fishing reel according to claim 4, further characterized by spring means coacting with the adjusting means for causing change from maximal to minimal braking force upon actuation of the clutch mechanism.

6. In a fishing reel according to claim 4, further characterized by the non-magnetic member being of cylindrical form concentrically disposed about the spool shaft, the magnets being arranged in first and second concentric paths on opposite sides of the non-magnetic member, the adjusting means permitting preselected disposition of the first and second concentric magnetic paths so as to relate the magnets of one path with those of another to create magnetic flux of predetermined strength relative to the intervening non-magnetic member.

7. In a fishing reel according to claim 4, further characterized by the non-magnetic member being of cylindrical form spacedly surroundingly and concentric with the spool axis, the magnets being constituted by a first set of magnets provided between the spool shaft and the non-magnetic member circumferentially of the spool shaft, and a cooperating magnet of generally arcuate configuration located spacedly outwardly of the non-magnetic member and upon a radius substantially concentric therewith, the adjusting means providing movement of said cooperating magnet toward and away from the non-magnetic member in alignment with the first magnets for varying the braking torque applied to the non-magnetic member.

8. In a fishing reel according to claim 1, further characterized by the adjusting means comprising an adjuster member rotative relative to the axis of rotation of the spool shaft, a camming surface provided on said adjuster member, and a cam follower connected to the cooperating magnet and cooperating with said camming surface.

9. In a fishing reel according to claim 1, the spool comprising a flange portion constituting the non-magnetic member, further characterized by the adjusting means including a rotative member disposed about the rotation axis of the spool shaft for rotative movement between minimal and maximum braking torque positions, arcuated cam means provided on said rotative member, magnetic carrying means provided on the shaft for carrying at least one of the magnets and adapted for rockable movement in a plane normal to said axis thereof, whereby upon rotation of the rotative member, the magnetic carrying means is elevated by the arcuated cam means to bring said at least one magnet into more intimate relationship with the spool flange for developing relatively greater braking torque therein.

* * * * *